US009620922B2

(12) United States Patent
Casalino et al.

(10) Patent No.: US 9,620,922 B2
(45) Date of Patent: Apr. 11, 2017

(54) LASER DEVICE

(71) Applicant: BIOS S.R.L., Vimodrone, Milan (IT)

(72) Inventors: Aldo Casalino, Milan (IT); Lorenzo Casalino, Milan (IT)

(73) Assignee: BIOS S.R.L., Milan (IT)

( * ) Notice: Subject to any disclaimer, the term of this patent is extended or adjusted under 35 U.S.C. 154(b) by 0 days.

(21) Appl. No.: 14/931,974

(22) Filed: Nov. 4, 2015

(65) Prior Publication Data
US 2016/0134077 A1 May 12, 2016

(30) Foreign Application Priority Data
Nov. 6, 2014 (IT) .............................. MI2014A1906

(51) Int. Cl.

| | |
|---|---|
| H01S 3/091 | (2006.01) |
| H01S 3/0915 | (2006.01) |
| H01S 3/092 | (2006.01) |
| H01S 3/093 | (2006.01) |
| H01S 3/04 | (2006.01) |
| H01S 3/042 | (2006.01) |
| H01J 61/06 | (2006.01) |
| H01J 61/30 | (2006.01) |
| H01S 3/02 | (2006.01) |
| H01J 61/52 | (2006.01) |
| H01J 61/80 | (2006.01) |
| H01J 61/56 | (2006.01) |

(52) U.S. Cl.
CPC ............ *H01S 3/0915* (2013.01); *H01J 61/06* (2013.01); *H01J 61/302* (2013.01); *H01S 3/025* (2013.01); *H01S 3/042* (2013.01); *H01S 3/0407* (2013.01); *H01S 3/092* (2013.01); *H01S 3/093* (2013.01); *H01J 61/52* (2013.01); *H01J 61/56* (2013.01); *H01J 61/80* (2013.01)

(58) Field of Classification Search
CPC ...... H01S 3/0407; H01S 3/0915; H01S 3/025; H01J 61/302; H01J 61/56
USPC .......................................................... 372/70
See application file for complete search history.

(56) References Cited

U.S. PATENT DOCUMENTS

| | | | |
|---|---|---|---|
| 3,611,189 A | 10/1971 | Stone et al. | |
| 4,644,550 A * | 2/1987 | Csery ..................... | A61F 9/008 372/10 |
| 5,805,625 A * | 9/1998 | Langner ................. | H01S 3/025 372/35 |
| 5,940,420 A | 8/1999 | Blair et al. | |

(Continued)

OTHER PUBLICATIONS

Search Report Dated Jul. 7, 2015.

*Primary Examiner* — Tuan Nguyen
(74) *Attorney, Agent, or Firm* — Arent Fox LLP; Michael Fainberg

(57) ABSTRACT

Disclosed is a lamp block comprising a lamp which is a glass tube having an internal final end and an external final end, wherein said internal final end ends with an electrode that fits directly into a connector placed on the machine into which said lamp is mounted and said external final end ends with an electrode to which a cable is connected, at least one portion of said cable being inserted in a key which is a hollow cylinder. Also disclosed is a laser apparatus suitable to house said lamp block and a method for extracting and housing said lamp block in said laser apparatus. In a preferred embodiment, said apparatus further comprise a system for electronic recognition.

10 Claims, 6 Drawing Sheets

(56) References Cited

U.S. PATENT DOCUMENTS

2003/0048524 A1\* 3/2003 Chavez-Pirson ....... H01S 3/063
 359/333
2006/0109878 A1\* 5/2006 Rothenberg .......... H01S 3/0606
 372/35

\* cited by examiner

LASER DEVICE

BACKGROUND

The present invention relates to the field of laser equipment, in particular to lamp pumped solid-state lasers used for applications in the medical and/or industrial sector, and to methods for easy and inexpensive replacement of said lamp.

Laser sources, in particular solid-state lasers, are optically pumped. Light at a given frequency is sent to the active material as a source of excitement. Where the active laser medium used is a crystal, the photons of said crystal, once excited, emit a laser beam at a defined wavelength.

The lamp pumped solid-state lasers commonly used in the medical and/or industrial sectors are, for example, the Alexandrite laser which emits at 755 nm+/−20%, the Nd:YAG which emits at 1064 nm+/−10%, or even at its harmonic wavelengths such as 355, 532, 1320, 1440. The Tullio laser emits between 1900 nm and 2000 nm+/−20%, the Holmium laser at 2100 nm+/−20%, the Er:Glass laser from 1540 to 1550 nm, the Er:YAG laser at 2940 nm, the Er, Cr:YSGG laser at about 2780 nm.

Generally, the light source is a lamp which is a glass tube sealed at the ends containing an inert gas under pressure, such as xenon, krypton, excimers, xenon bromide. The positive and negative cables connected to the capacitors which provide for storing and discharging to the lamp the energy required for the impulse, are connected to the terminals of electrodes at the ends of said tube. Depending on the operating conditions, said lamp has a limited life and, after a certain time, decreases in intensity. In addition to natural ageing, it may happen that a lamp fails suddenly, for example on account of breakage of the glass or otherwise.

To date, the replacement of the lamp requires the intervention of an experienced technician. The replacement of the lamp in the laser devices available to date involves the removal of part of the body, the opening of the optical bench, the detachment of the resonator from the hydraulic system after previously emptying out the cooling water therefrom, the disconnection of the electrical connections and then the removal and replacement of the lamp. This procedure involves the risk of soiling the mirrors on the side of the resonator, or the faces of the crystal. Also, there is a serious risk of breaking the lamp itself. Additionally, the laborious replacement of the lamp frequently entails a movement of the optical axis, with the consequent need to realign the optical bench. The drawbacks and costs related to replacing the lamp in laser instruments in use today are thus significant, in addition to the inevitable inconvenience of machine downtime.

By way of example, the full-time use of an Alexandrite laser entails the need for a monthly replacement of the lamp. The costs associated with the replacement of the lamp are therefore not negligible in the overall economy of use of the machine.

U.S. Pat. No. 4,313,092 describes a laser apparatus provided with an automated system for the replacement of the lamp. Said system comprises a mobile housing having a series of cavities, each of which contains a lamp. Said housing moves automatically so that at defined times a new lamp automatically reaches the operating position. The solution postpones the problem but does not resolve it, requiring operations of a certain complexity to replace the entire set of lamps available in the mobile housing cavity.

U.S. Pat. No. 5,012,481 describes a replacement block of a laser lamp. The replacement of the entire block facilitates the replacement operation but increases the cost given the need to replace the whole block and not just the lamp.

U.S. Pat. No. 4,644,550 discloses a lamp wherein the two end terminals are connected with cables.

U.S. Pat. No. 5,805,625 discloses a lamp with fittings that function as electrical connector to which cables are connected.

The need for a laser system in which lamp replacement can be performed rapidly even by an unskilled operator is deeply felt.

SUMMARY

The present invention relates to a lamp block for a laser apparatus which makes it possible to rapidly and economically replace a lamp due to wear or to a failure, without requiring a long and expensive service interruption and without the need for intervention by a specialist.

The lamp block described below allows easy replacement and disposal solely of said lamp block.

In a preferred embodiment, the apparatus of the present invention comprises a system of electronic recognition.

DETAILED DESCRIPTION

The present invention relates to a lamp block that comprises a lamp, which is a glass tube that contains an inert gas under pressure with sealed final ends having an internal final end and an external final end. On each of the two ends an electrode is present. Said lamp block is characterised in that the electrode on the internal final end fits directly into a connector placed on the machine into which said lamp is mounted and the external final end is connected to a cable, where at least a portion of said cable is inserted in a key which is a hollow cylinder.

In a preferred embodiment, said electrode on the internal final end is the negative electrode, said electrode on the external final end is the positive electrode.

Figure 1:
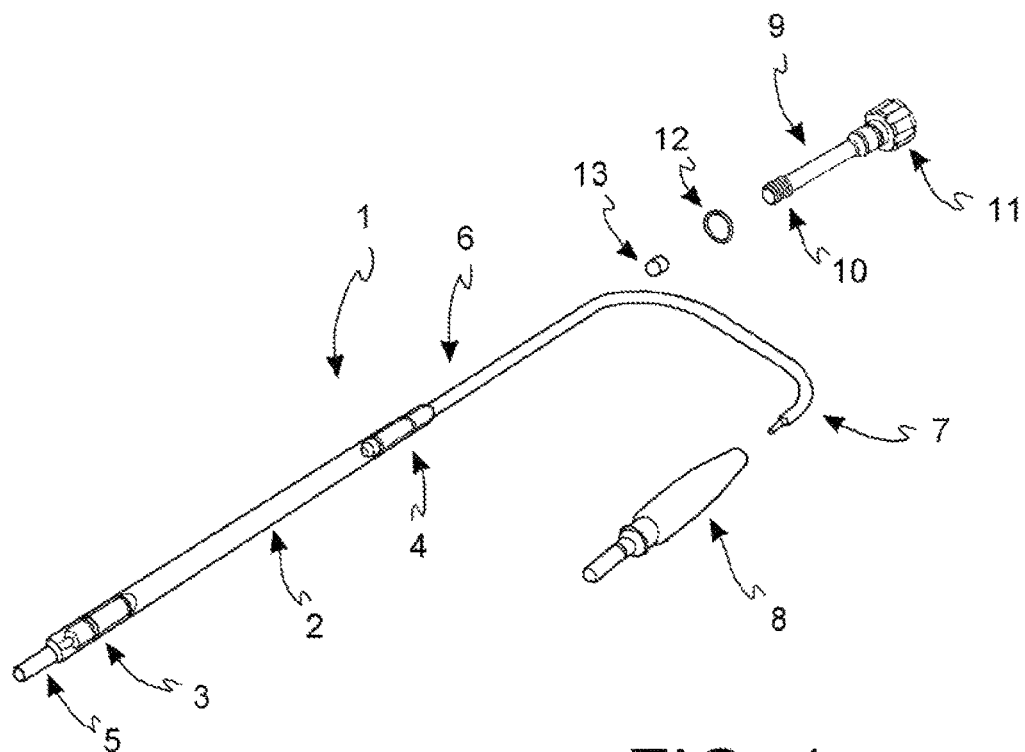
FIG. 1: exploded view of the lamp block of the present invention.
Figure 2:
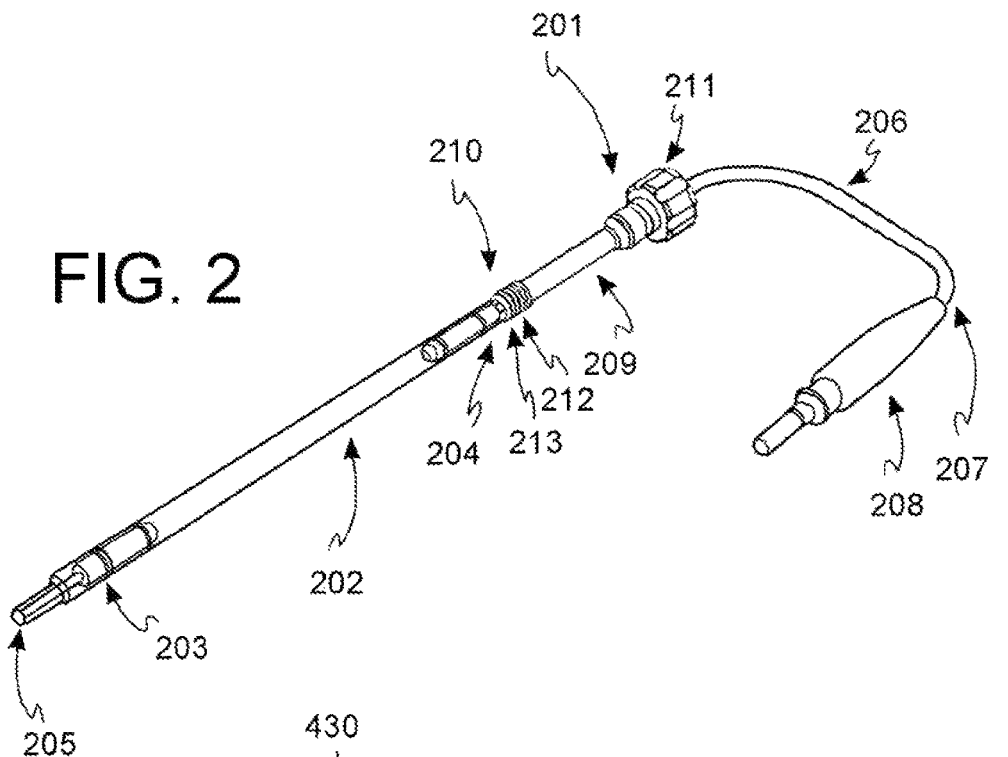
FIG. 2: perspective view of the lamp block of the present invention.

With reference to FIGS. 1 and 2, said lamp block 1, 201, comprises a lamp which is a glass tube 2, 202 sealed at the internal 3, 203 and external final ends 4, 204. Said glass tube contains an inert gas under pressure. At the internal final end 3, 203 of said glass tube, is an electrode 5, 205. At the external final end 4, 204, of said glass tube is a further electrode to which a cable 6, 206 is connected. Said cable has a proximal end which comes into contact with said electrode on said glass tube and a distal end 7, 207. At the distal end 7, 207 of said cable 6, 206 a plug 8, 208 is preferably joined. Said cable 6, 206 is inserted, at least for a portion thereof, in a key 9, 209 which is a hollow cylinder having a proximal portion 10, 210 and a distal portion 11, 211. Preferably, said proximal portion 10, 210 of said key 9, 209 and said external final end 4, 204 of said glass tube 2, 202 are separated by gaskets 12, 13, 212, 213.

Figure 3:
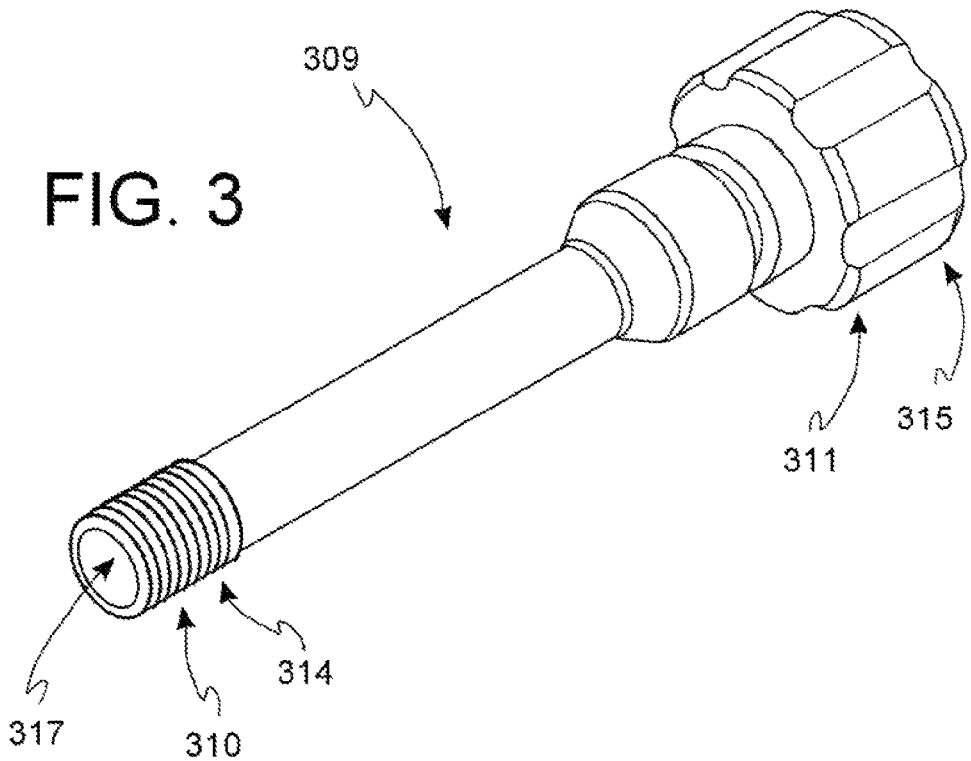
FIG. 3: perspective view of the so-called key.

An example of said key is represented schematically in FIG. 3. Said proximal portion 310 of said key 309 has an outer thread 314. Preferably, said distal portion 311 of said key 309 has a rough or grooved outer surface 315.

In a second embodiment, said apparatus further comprises a system of electronic recognition. Said system of electronic recognition is selected in the group comprising a memory chip, a transponder RFID or a Bluetooth. In a preferred embodiment, said system is a memory chip 790 comprising a printed circuit board 791 and a memory 792. In this embodiment, on said distal portion 811, 911 of said key 809, 909 is positioned said printed circuit 891, 991. By inserting said lamp in a machine 430, for example following the procedure described in the paragraphs that follow, said printed circuit 891, 991 comes in contact with said memory which is a card comprising pin spring 792 positioned on the external base 440 of said machine 430.

The present invention also relates to a machine 430, where said machine 430 is a laser apparatus comprising a resonator, an active material (rod) and at least one lamp, characterised in that said at least one lamp is housed in a housing 431 provided in the at least one resonator 433 and said housing 431 has an external base 440 opening outwardly of the machine and an internal base on which a contact is rested, which is a blade connector on which the electrode on the internal final ends of said lamp fits directly and said machine also comprises at least one socket 432 which is external to the machine and to which the external terminal of said lamp is connected.

Said resonator is typically composed of two mirrors opposite each other in the middle of which is the rod. Said resonator, rod and lamp are immersed in water, said water is in a closed circuit which generally comprises a tank, a radiator and a pump. Said water has the function of cooling the lamp and the rod.

Preferably, said machine is a lamp-pumped solid-state laser.

Preferably, said cable 406 is inserted with a pin 408 in said socket 432.

In a preferred embodiment, said portion of the machine in which said at least one socket 432 and said at least one external base 440 of said at least one housing 431 are located, is closed by a door or a cover, preferably by a door 435.

In a further preferred embodiment, said machine comprise at least a memory which is part of a system of electronic recognition, wherein said memory is preferably a card positioned on said external base (440).

Figure 4:
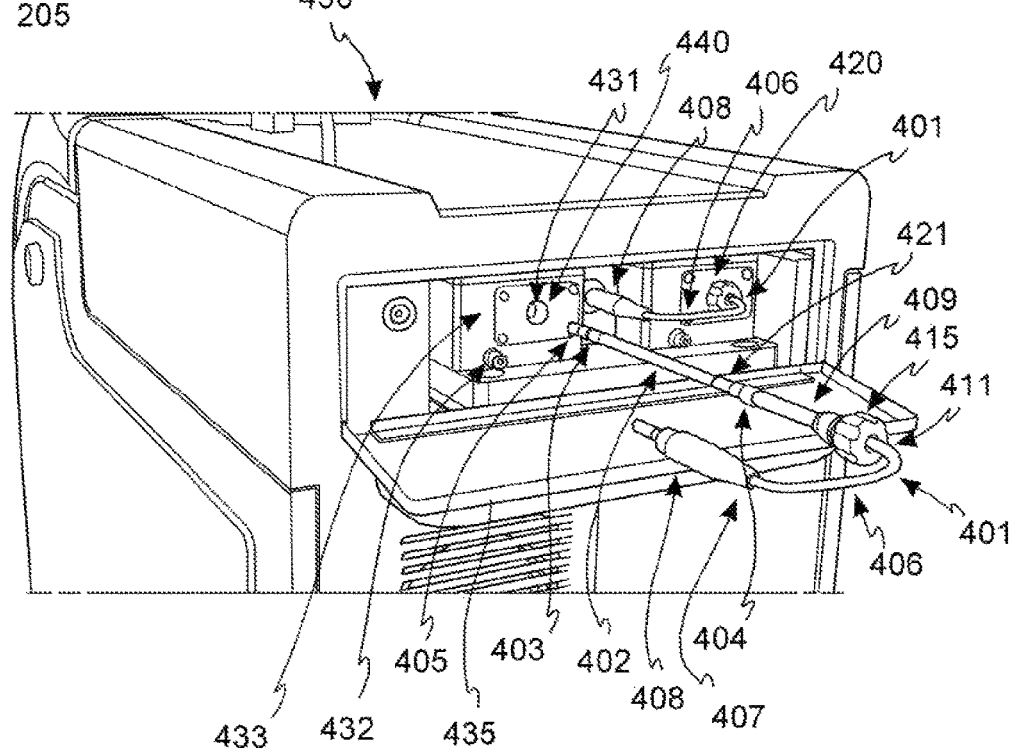
FIG. 4: perspective view of a portion of a laser machine housing two lamp blocks.

The example in FIG. 4 shows a portion of the machine 430 in an embodiment in which there are two lamp blocks 401; one of these, 420, is shown positioned in the housing, the other, 421, is shown in the insertion step.

Said blade connector is selected between single section blade connectors or double section blade connectors. Preferably, said single section blade connector has about 20 blades, said double section blade connector has about 40 blades. Said blades are preferably spirally arranged springs, preferably made of silver plated beryllium copper.

Figure 5:
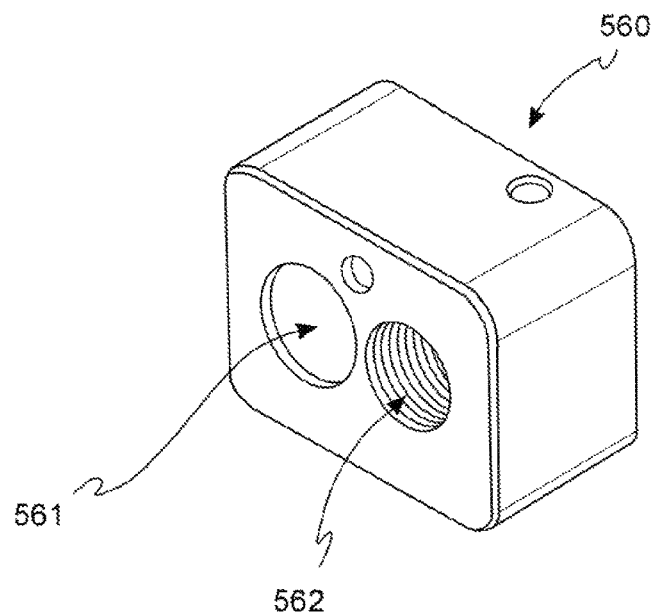
FIG. 5: a perspective view of an embodiment of a cooling block.

In a preferred embodiment, said contact which is a blade connector is inserted in a cooling block. Preferably, said cooling block is of the type shown in FIG. 5 and is a cooling block 560 of steel, inside which cooling water circulates. Said cooling block 560 has two openings 561 and 562. The blade connector fits into the opening 562. The opening 561 is functional to the passage of the laser beam emitted by the rod which is located in the immediate vicinity of said lamp which goes to engage, by means of an electrode, on said blade connector. Preferably, the opening 562 has an internal thread. In this embodiment, said blade connector has an external thread so as to house itself screwed into said opening 562 of said cooling block 560. Preferably, said cooling block has the shape of a parallelepiped.

Figure 6:
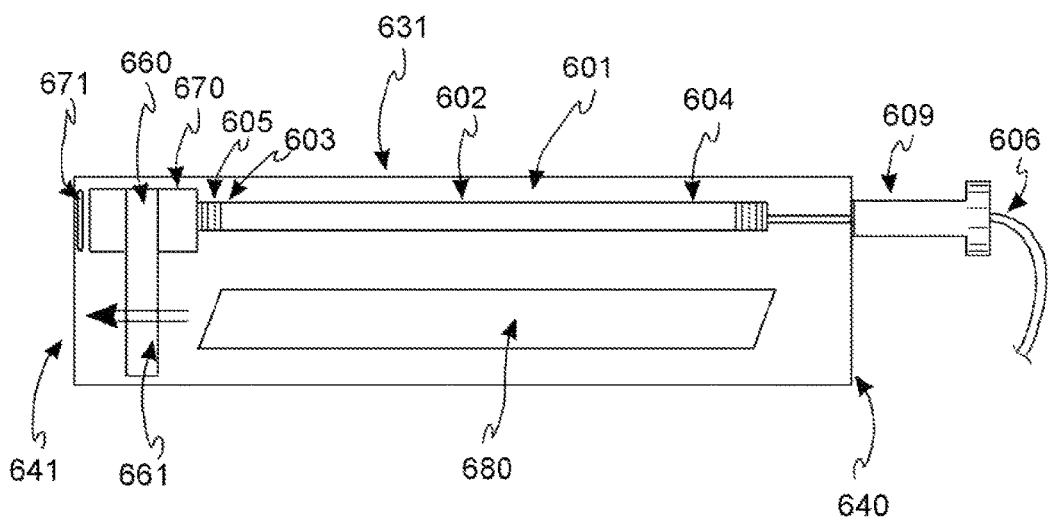
FIG. 6: cross-section view of a lamp block inside the resonator of a machine.
Figure 7:
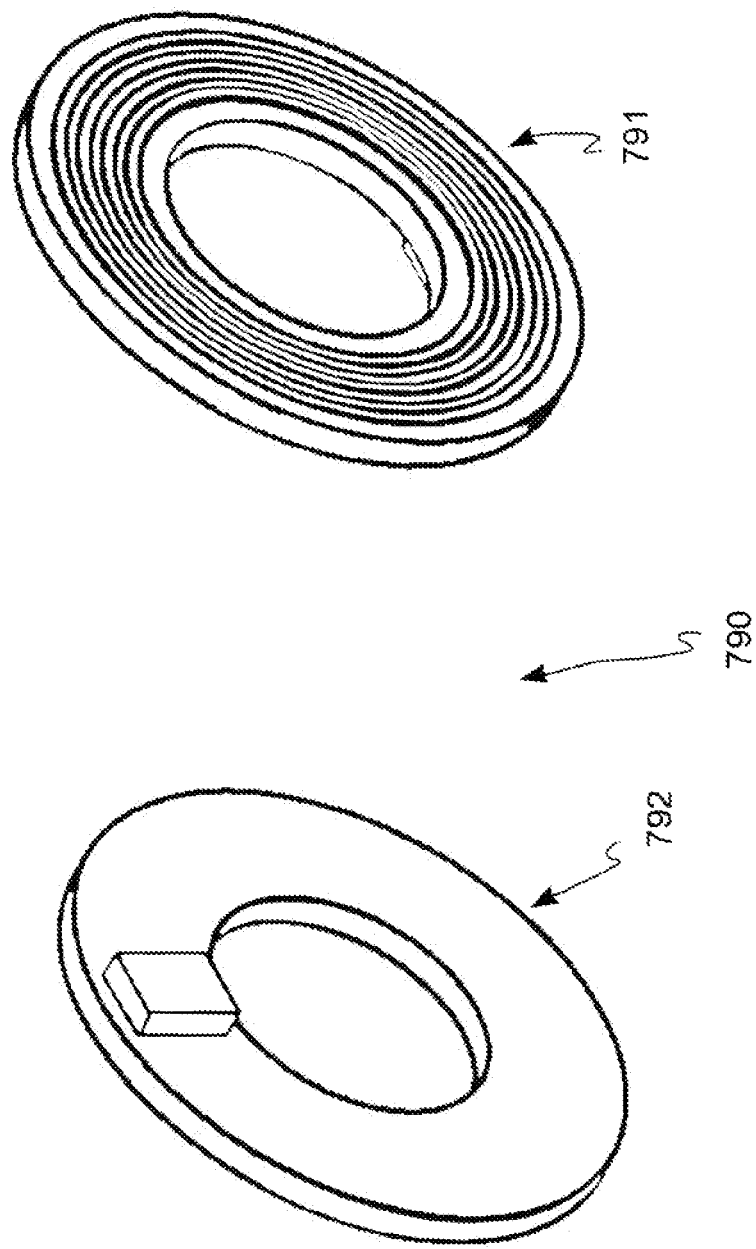
FIG. 7: view of the system of electronic recognition.
Figure 8:
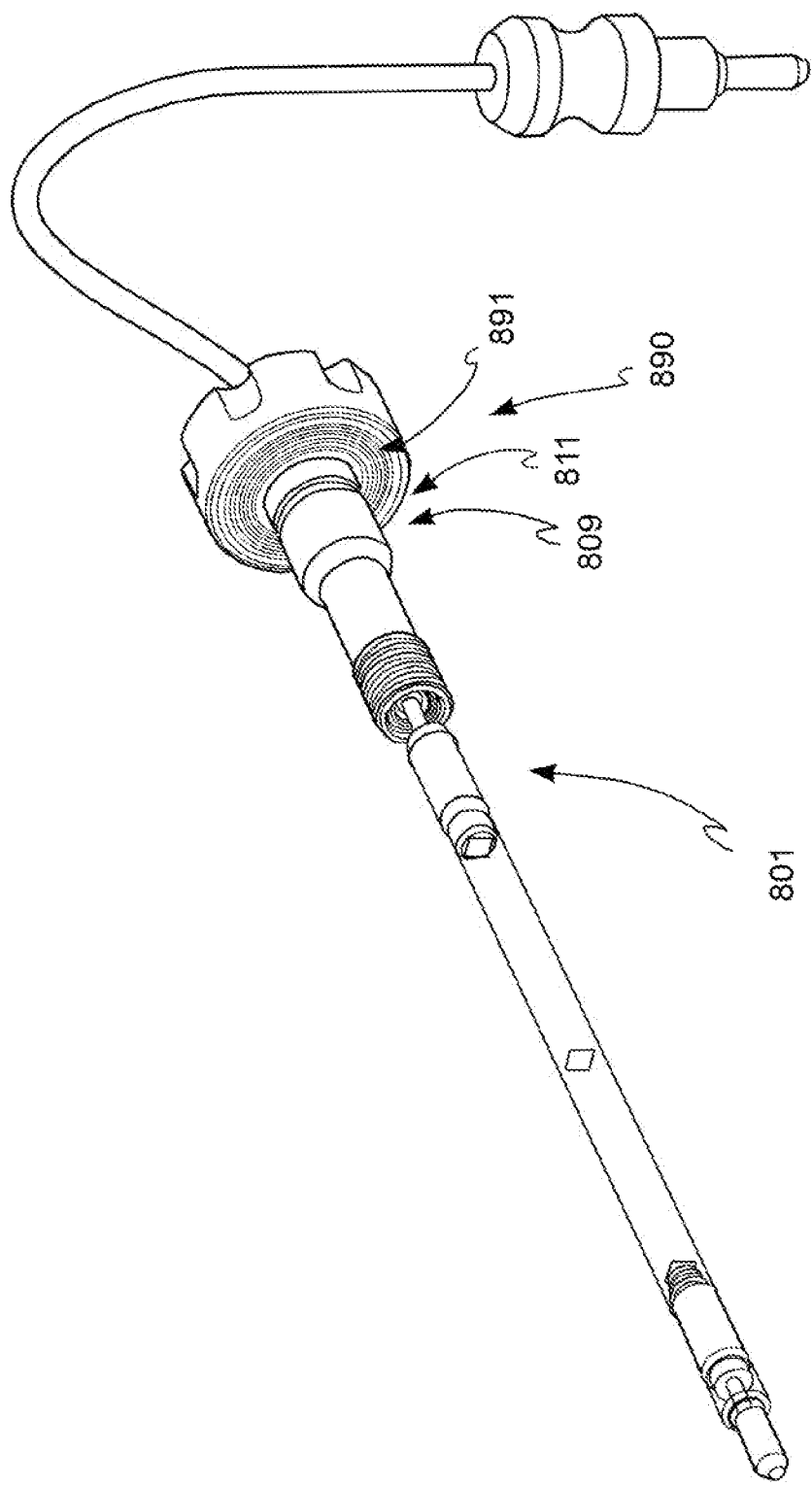
FIG. 8: perspective view of a second embodiment of the lamp block of the present invention, comprising a printed circuit, part of the system of electronic recognition.
Figure 9:
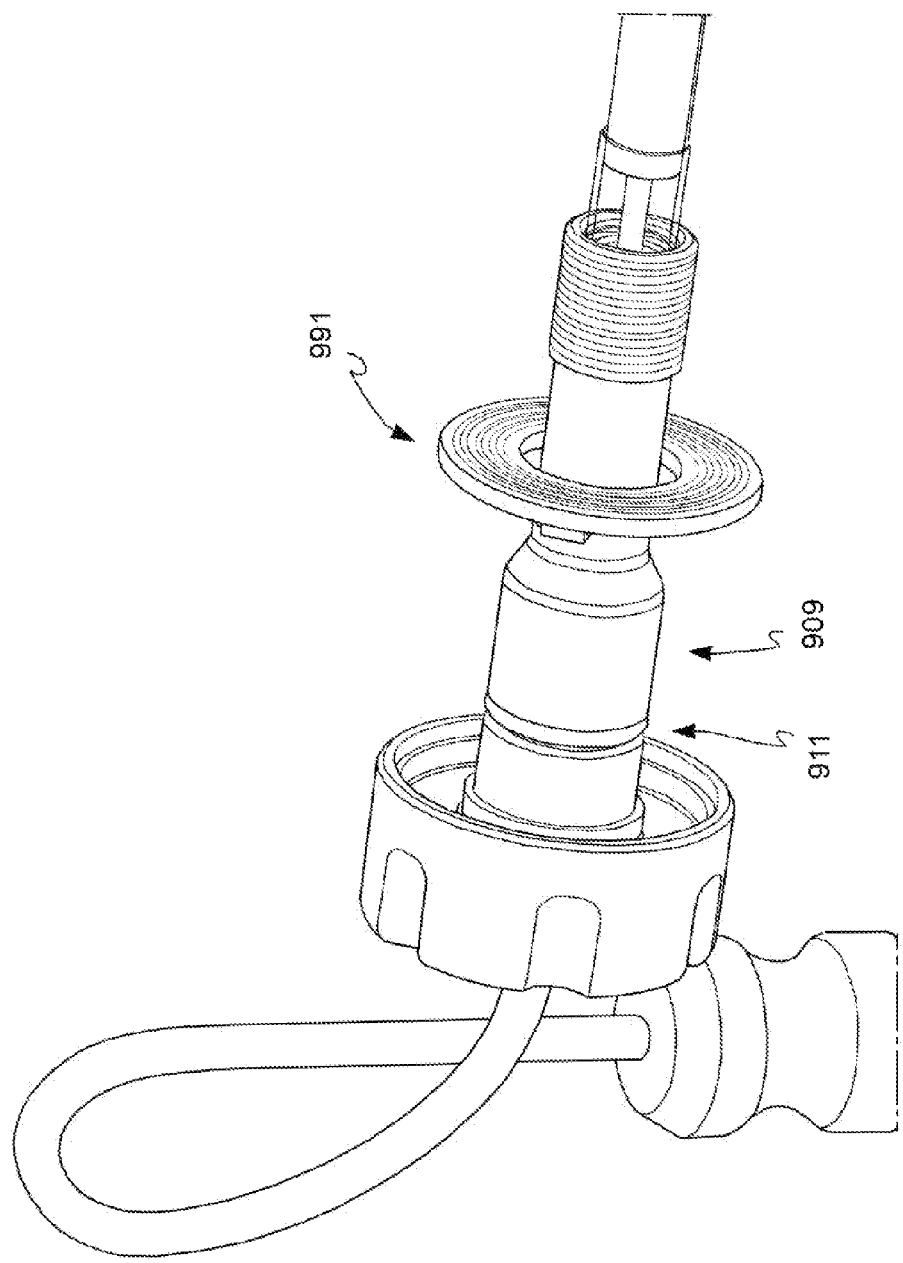
FIG. 9: perspective view of the so-called key in an embodiment of the present invention, comprising a memory, part of the system of electronic recognition.

FIG. 6 is an embodiment of the present invention and shows, in cross-section, a block 601 inserted in the cylindrical housing 631 of a machine, where said housing has an external base 640 that opens to the outside of the machine and a internal base 641. Said electrode 605 on said internal final end 603 of the glass tube 602 is fitted onto on said blade connector 670. Said blade connector is inserted in the cooling block 660. The rod 680 is placed in proximity to said lamp, and the opening 661 of said cooling block 660 is functional to the passage of the laser beam emitted by said rod. The face of said blade connector, opposite the face on which the electrode 605 engages is separated from the inner base 641 of the housing 631 by a gasket 671. A cable 606 emerges from the electrode 604 on the external final end of said glass tube and is preferably welded to said electrode and said cable is inserted in said key 609.

During the insertion step of said lamp block in said cylindrical housing, said key, screwing, pushes said glass tube in a controlled manner towards the inside of the machine. Reaching the final screwing position of the key corresponds to complete engagement of the electrode 605 on the blade connector 670 being accomplished. In addition, when the gasket 671 is placed between said blade connector 670 and the inner base 641 of said housing 631, the complete engagement of the electrode on the blade connector exerts a compression on the gasket such as to close the water circuit. When the machine is started and the pump comprised in the cooling circuit comes into action, thanks to the closure of said circuit operated by the compression of said gasket by screwing the key the circuit is pressurised. Unscrewing said key, said compression comes to lapse so that the circuit opens and the water level therein falls.

Alternatively or in addition to the gasket described above, a further security mechanism for lowering the water level in the circuit may be present. In one embodiment, said further mechanism is operated by the door 435 which controls a seal valve which opens on said closed cooling circuit. By opening the door, said valve is opened, with the consequent entry of air in the circuit and lowering of the water level.

A further aspect of the present invention relates to a method for the removal and a method for the housing of said lamp block 401 inside a machine 430.

Said method comprises the following steps in the sequence indicated:

providing a lamp block 401 comprising:
a glass tube with sealed final ends containing an inert gas under pressure, where said glass tube ends with an electrode 405 at the internal final end 403 and with a further electrode from which a cable 406 emerges at the external final end 404, where the emerging point of said cable from said glass tube is called proximal end, the opposite end is called distal end 407;

optionally, a plug 408 joined to the proximal end 407 of said cable 406.

a key 409 which is a hollow cylinder in which at least a portion of said cable 406 is inserted;

providing a machine 430, wherein said machine 430 is a laser apparatus comprising a resonator 433, a rod, at least one housing 431 having an external base 440 opening outwardly of the machine and an internal base on which a contact is rested, which is a blade connector, said housing being adapted to accommodate said lamp block 401 and said machine also comprising at least one socket 432 external to the machine for the connection with the external terminal of said lamp block 401 and, optionally, a closable door 435 to protect the at least one resonator 433 containing the rod and the housing 431, and the at least one socket 432;

opening said door 435, if present;

inserting said lamp block 401 in said housing 431 inside the resonator 433 in the machine 430, tightening said key 409 and consequently fully directly fitting the electrode 405 in the blade connector; inserting the cable in the socket 432;

where desired to proceed with removal, extracting the external terminal, which is preferably the plug 408, from the socket 432, unscrewing the key 409, extracting the lamp block 401;

optionally, closing the door 435.

In a preferred embodiment, wherein said lamp block further comprises a system of electronic recognition, wherein on said distal portion (811, 911) of said key (809, 909) is positioned a printed circuit (891, 991) and on said external base (440) of said machine (430) is positioned a memory which is a card comprising pin spring (792), in said step d) when said lamp block (401) is inserted in said housing (431) said printed circuit (891, 991) contacts said card comprising pin spring (792) therefore activating said system of electronic recognition.

In said step of screwing, the external thread of said key engages on an internal thread present on the external base 440 of said housing 431. The rough or grooved external surface 415 of the distal portion 411 of said key 409 permits easy gripping by the operator.

Thanks to said control systems of the closure of the cooling circuit given by the gasket interposed between said blade connector strip and the internal base of the housing and/or the valve connected to the door, the lamp block is removed and housed in the resonator without the need to empty the circuit and without any leakage of water occurring, since the water level in the circuit is lowered due to the opening of the circuit itself brought about by the unscrewing of the key and/or opening of the door.

An additional safety control instrument of the correct assembly is given by a chip for RFID (radio frequency identification) recognition. In one embodiment, said key comprises said chip so that the machine only comes into operation in the presence of the key correctly positioned. Said chip, the functioning of which is known to the experts in the sector, also makes it possible to monitor the operation of the lamp by storing data, such as the number of beams emitted, the serial number of the machine, the date of the lamp batch or any other data of interest to the user.

Additional safety systems, known to the experts in the sector, may be applied to the machine of the present invention.

For example, in one embodiment, the opening of said door 435 is connected to the opening of a micro switch which disconnects the machine from the power grid.

In a further embodiment, to guarantee the correct insertion of said lamp, in said machine there is a lever mechanism on said resonator. Only when said lamp is correctly inserted does said lever mechanism act on a micro switch which enables the machine to operate. By unscrewing said key, said lever mechanism opens the micro switch, disconnecting, where not already disconnected, the machine from the power grid.

The RFID sensor, where present, contributes as a third system for disconnecting the machine from the power grid when the lamp is removed and the sensor, placed near the entrance of the lamp housing, is moved away from the receiver.

The solution of the present invention surprisingly offers the following advantages:

the electrode on the internal final end of the glass tube of the lamp block engages on the blade connector placed on the internal base of the housing simply by screwing the key of the lamp block. The contact that is formed is such as to support high voltages and currents (up to 1000 V 600 A). This is permitted since the system of screwing the key ensures a calibrated engagement and the blade contact properly engaged prevents the formation of electric arcs which could lead to short-circuiting. The key prevents excessive tightening, where excessive tightening could cause breaking of the glass tube;

the presence of a multiplicity of blades on the connector allows the current to be evenly distributed, avoiding clumping. Moreover, the force required for insertion and extraction is less than that required using other types of connectors, such as groove connectors. Said blade connector has a very low resistance, of about 50 microohm and withstands high currents and voltages, up to 600 A in continuous current and 25 KA in discharge mode. The life span of said blade connectors is about ten times higher than that of other connectors;

the cooling block proposed for said connector obviates the problem of the inevitable heating which occurs on said blade connector, which supports high working voltages and currents;

the method of replacing the lamp described and claimed herein, possible solely thanks to the provision of the lamp block of the present invention, permits easy replacement, from the outside, without the need to remove the outer body and open the optical bench and/or the resonator;

the presence of a gasket or O-ring adjacent to the blade contact, which allows the opening and closing of the cooling circuit of the resonator controlled by the key, ensures replacement of the lamp block without the need for preventive and inconvenient emptying of the water in said circuit;

the machine can be easily implemented with one or more operating and/or safety control systems.

In the embodiment that includes a system of electronic recognition of the lamp, the present invention likewise offers the following advantages:

Specific information on lamp specifications: serial number, lot, date of production, installation date, even for possible warranty claims.

Information on the registration number of the machine, for a total count of shot performed on said machine, and to prevent the lamp being used on other systems.

Information on the number of shots made by the lamp, for a timely warning of the upcoming depletion of the lamp.

Interruption of machine operation if the lamp is not correctly inserted, or if the reading is not done properly.

Rental function, to allow only a predefined number of shots to the machine. Exhausted the shots programmed, there is the possibility to buy more shots via web.

Information about the parameters used with the lamp, for the analysis even in remote of the procedures applied by the operator.

Function of scheduled maintenance.

The invention claimed is:

1. A machine being a laser apparatus comprising a resonator, an active material rod and at least one lamp, said at least one lamp being a glass tube having an internal final end and an external final end, said internal final end ends with an electrode and said external final end ends with an electrode to which a cable is connected, said lamp being housed in a housing provided in the at least one resonator, said housing having an external base opening outwardly of the machine and an internal base on which a contact is rested, which is a blade connector, wherein said electrode on said internal final end fits directly into said blade connector and said machine also comprises at least one socket which is external to the machine and to which said cable is connected, wherein at least one portion of said cable is inserted in a key which is a hollow cylinder.

2. The machine according to claim 1, wherein said blade connector is a single or double section blade connector and said blades are spirally arranged springs, made of silver plated beryllium copper.

3. The machine according to claim 1, wherein said blade connector is inserted in a cooling block which is a steel cooling block.

4. The machine according to claim 1, also comprising a closable door to protect the machine which accommodates said at least one socket and said at least one external base of said at least one housing.

5. The machine according to claim 1, wherein the face of said blade connector opposite to the face on which the electrode is inserted is separated from the internal base of the housing by a seal, which is an O-ring, which is an opening valve of the cooling water closed circuit.

6. The machine according to claim 1, further comprising a card comprising pin spring positioned on said external base.

7. The machine according to claim 1 being a laser apparatus comprising a resonator, an active material rod and at least one lamp, said at least one lamp being a glass tube having an internal final end and an external final end, said internal final end ends with an electrode and said external final end ends with an electrode to which a cable is connected, wherein at least one portion of said cable is inserted in a key which is a hollow cylinder, said key further comprising a system of electronic recognition which is a memory chip comprising a printed circuit board and a memory wherein on the distal portion of said key is positioned said printed circuit, said lamp being housed in a housing provided in the at least one resonator, wherein said housing has an external base opening outwardly of the machine and an internal base on which a contact is rested, which is a double section blade connector wherein said blades are spirally arranged springs made of silver plated beryllium copper into which said electrode on said internal terminal end fits directly, and said machine also comprises at least one socket which is external to the machine and to which said cable is connected, wherein said blade connector is inserted in a cooling block which is a steel cooling block, wherein the face of said blade connector opposite to the face on which the electrode is inserted is separated from the internal base of the housing by an O-ring which is an opening valve of the cooling water closed circuit, said machine further comprising said memory which is a card comprising pin spring positioned on said external base.

8. A method for housing and removing a lamp block within a machine comprising the following steps, in the following sequence:

providing a lamp block comprising:
a glass tube with sealed final ends containing an inert gas under pressure, where said glass tube ends with an electrode at the internal final end to fit directly into a connector and with a further electrode from which a cable emerges at the external final end, where the emerging point of said cable from said glass tube is called proximal end, the opposite end is called distal end;
optionally, a plug joined to the distal end of said cable;
a key being a hollow cylinder in which at least one portion of said cable is inserted;
providing the machine, wherein said machine is a laser apparatus comprising a resonator, an active material rod and at least one housing having an external base opening outwardly of the machine and an internal base on which a contact is rested, which is a blade connector, said housing adapted to accommodate said lamp block and said machine also comprises at least one socket external to the machine for the connection with the external terminal of said lamp block and, optionally, a closable door to protect the at least one resonator containing the rod and the housing, and the at least one socket;
opening said door, if present;
inserting said lamp block in said housing internal to the resonator in the machine, tightening said key and consequently fully fitting the electrode on the internal terminal in the blade connector;
inserting the external terminal, which is the plug, in the socket;
if it is desired to proceed with the removal, extracting the external terminal, which is the plug, from the socket, unscrewing the key, extracting the lamp block;
optionally, closing the door.

9. The method according to claim 8, wherein said lamp block further comprises a system of electronic recognition, wherein on said distal portion of said key is positioned a printed circuit and on said external base of said machine is positioned a memory which is a card comprising pin spring, wherein when said lamp block is inserted in said housing said printed circuit contacts said card comprising pin spring therefore activating said system of electronic recognition.

10. The method according to claim 8, wherein in said machine the face of said blade connector opposite to the face on which the electrode is inserted is separated from the internal base of the housing by a seal and by tightening said key, thereby compressing said seal, a circuit for the circulation of water in which said resonator, active material and lamp are immersed is closed.

* * * * *